United States Patent
Long et al.

(10) Patent No.: US 11,868,330 B2
(45) Date of Patent: Jan. 9, 2024

(54) METHOD FOR INDEXING DATA IN STORAGE ENGINE AND RELATED APPARATUS

(71) Applicant: TENCENT TECHNOLOGY (SHENZHEN) COMPANY LIMITED, Shenzhen (CN)

(72) Inventors: Jian Long, Shenzhen (CN); Wenliang Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 67 days.

(21) Appl. No.: 17/671,578

(22) Filed: Feb. 14, 2022

(65) Prior Publication Data

US 2022/0171754 A1 Jun. 2, 2022

Related U.S. Application Data

(63) Continuation of application No. PCT/CN2020/126397, filed on Nov. 4, 2020.

(30) Foreign Application Priority Data

Jan. 8, 2020 (CN) .......................... 202010018746.0

(51) Int. Cl.
*G06F 16/00* (2019.01)
*G06F 16/22* (2019.01)
*G06F 16/2455* (2019.01)

(52) U.S. Cl.
CPC .... *G06F 16/2272* (2019.01); *G06F 16/24564* (2019.01)

(58) Field of Classification Search
CPC ........................ G06F 16/2272; G06F 16/24564

(Continued)

(56) References Cited

U.S. PATENT DOCUMENTS

| | | | |
|---|---|---|---|
| 5,515,531 A | 5/1996 | Fujiwara et al. | |
| 8,655,894 B2 | 2/2014 | Gieseke et al. | |
| 2012/0143912 A1* | 6/2012 | Horton | G06F 16/24564 |
| | | | 707/774 |

FOREIGN PATENT DOCUMENTS

| | | |
|---|---|---|
| CN | 102750376 A | 10/2012 |
| CN | 102918529 A | 2/2013 |

(Continued)

OTHER PUBLICATIONS

European Patent Office European Search Report for Application No. 20912,278.7 dated Oct. 20, 2022 8 pages.

(Continued)

*Primary Examiner* — Chelcie L Daye
(74) *Attorney, Agent, or Firm* — ANOVA LAW GROUP PLLC

(57) ABSTRACT

A method for indexing data in a storage engine includes: obtaining a target transaction, the target transaction indicating a process of indexing data; determining target data in a first storage engine according to the target transaction, the target data being comprised in at least one first index table; determining, according to the first index table, at least one second index table configured in a second storage engine, the second index table being obtained by adding row numbers based on the first index table, the row numbers indicating row data in the target data, and the second storage engine supporting execution of the target transaction; and determining, according to a data index condition in the first storage engine, index data from the second index table, the index data being comprised in the target data.

20 Claims, 9 Drawing Sheets

(58) Field of Classification Search
USPC .................................................. 707/696, 774
See application file for complete search history.

(56) References Cited

FOREIGN PATENT DOCUMENTS

| CN | 106326381 A | 1/2017 |
|----|-------------|--------|
| CN | 106777027 A | 5/2017 |
| CN | 111259004 A | 6/2020 |
| JP | H05334165 A | 12/1993 |
| JP | 2013171483 A | 9/2013 |

OTHER PUBLICATIONS

Alamoudi Abdullah et al: "External Data Access And Indexing In AsterixDB", User Interface Software and Technology, Oct. 2015 (Oct. 17, 2015), pp. 3-12.
Elmasri Ramez et al: "Indexing Structures for Files", Fundamentals of Database Systems—6th edition, 2010, pp. 631-675.
The World Intellectual Property Organization (WIPO) International Search Report for PCT/CN2020/126397 dated Feb. 7, 2021 6 Pages (including translation).
The Japan Patent Office (JPO) Notification of Reasons for Refusal for Application No. 2022-519003 and Translation dated Apr. 17, 2023 4 Pages.

\* cited by examiner

METHOD FOR INDEXING DATA IN STORAGE ENGINE AND RELATED APPARATUS

CROSS-REFERENCES TO RELATED APPLICATIONS

This application is a continuation application of PCT Patent Application No. PCT/CN2020/126397, entitled "METHOD FOR INDEXING DATA IN STORAGE ENGINES, AND RELATED DEVICE" and filed on Nov. 4, 2020, which claims priority to Chinese Patent Application No. 202010018746.0, entitled "METHOD FOR INDEXING DATA IN STORAGE ENGINE AND RELATED APPARATUS", and filed with the China National Intellectual Property Administration on Jan. 8, 2020, the entire contents of both of which are incorporated herein by reference.

FIELD OF THE TECHNOLOGY

The present disclosure relates to the field of computer technologies, and in particular, to indexing data in a storage engine.

BACKGROUND OF THE DISCLOSURE

With the development of cloud technologies, more and more application appears in human life. However, in the cloud technologies, the participation of a database is required to implement a data interaction. In short, the database may be considered as an electronic file cabinet, that is, a place for storing an electronic file. A user may perform an operation such as add, query, update, or delete data in the file.

Generally, a database management system MySQL that supports a plurality of storage engines may be used for being applicable to different application scenarios. The ability of different storage engines to support transactions may be different. For example, an InnoDB storage engine implements a complete transaction support, and also supports an XA protocol of a distributed transaction. However, an MyISAM storage engine is convenient for expanding. In addition, a NEWDB engine supports a single-statement transaction, thereby improving a data index process of a plurality of scenarios.

SUMMARY

In view of this, the present disclosure provides a method for indexing data. The method may effectively reduce the complexity of the storage engine application process and code redundancy, thereby improving the efficiency of a data index process.

According to an aspect, embodiments of the present disclosure provide a method for indexing data, applied to a system or a program including a data index function in a terminal device. The method includes: obtaining a target transaction, the target transaction indicating a process of indexing data; determining target data in a first storage engine according to the target transaction, the target data being comprised in at least one first index table; determining, according to the first index table, at least one second index table configured in a second storage engine, the second index table being obtained by adding row numbers based on the first index table, the row numbers indicating row data in the target data, and the second storage engine supporting execution of the target transaction; and determining, according to a data index condition in the first storage engine, index data from the second index table, the index data being comprised in the target data.

According to another aspect, the embodiments of the present disclosure provide a computer device. The computer device includes a memory, a processor, and a bus system, the memory being configured to store a program code, and the processor being configured, according to instructions in the program code, to perform: determining target data in a first storage engine according to the target transaction, the target data being comprised in at least one first index table; determining, according to the first index table, at least one second index table configured in a second storage engine, the second index table being obtained by adding row numbers based on the first index table, the row numbers indicating row data in the target data, and the second storage engine supporting execution of the target transaction; and determining, according to a data index condition in the first storage engine, index data from the second index table, the index data being comprised in the target data.

According to another aspect, the embodiments of the present disclosure provide a non-transitory storage medium, the storage medium being configured to store a computer program. The computer program, when executed by a processor, causes the processor perform the method for indexing data according to the foregoing aspect.

According to another aspect, the embodiments of the present disclosure provide a computer program product including instructions, the instructions, when run on a computer, causing the computer to execute the method for indexing data according to the foregoing aspect.

As can be seen from the foregoing technical solutions, the embodiments of the present disclosure have the following advantages.

A target transaction is indexed by obtaining indication data, the target data in the first storage engine is determined according to the target transaction, and the target data is included in at least one first index table. Then at least one second index table configured in a second storage engine is determined according to the first index table, the second index table is obtained by adding row numbers based on the first index table, the row numbers are used for indicating row data in the target data, and the second storage engine supports execution of the target transaction. Further, index data corresponding to a data index condition in the first storage engine is determined from the second index table. Therefore, a data index process across storage engines is implemented. Because the development complexity of introducing new storage engine is reduced, the code reuse of a plurality of storage engines is implemented, and the index efficiency of a database is improved. Further, through the functional design of the second storage engine, the first storage engine can perform a function that the first storage engine cannot mount, which further improves the application range and index efficiency of the database.

DESCRIPTION OF EMBODIMENTS

Figure 1:
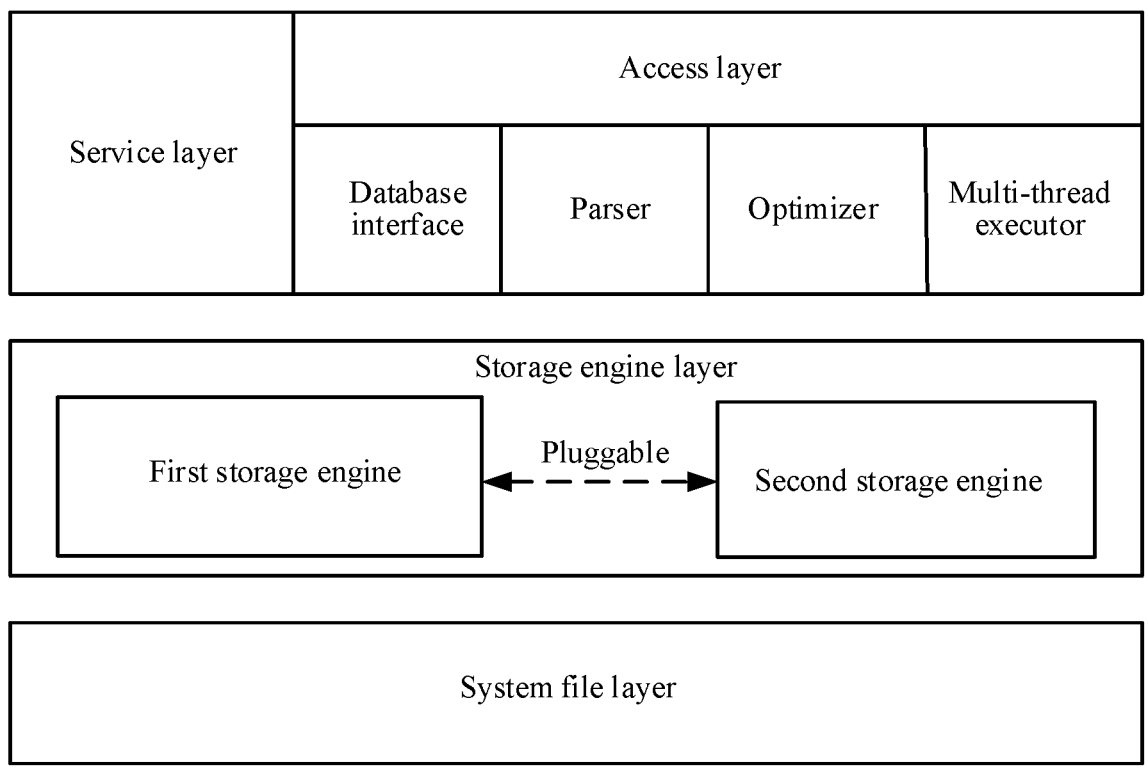
FIG. 1 is a diagram of a network architecture for running a data index system.

The embodiments of the present disclosure provide a method for indexing data and a related apparatus, applicable to a system or a program including a data index function in a terminal device. A target transaction is indexed by obtaining indication data, the target data in the first storage engine is determined according to the target transaction, and the target data is included in at least one first index table. Then at least one second index table configured in a second storage engine is determined according to the first index table, the second index table is obtained by adding row numbers based on the first index table, the row numbers are used for indicating row data in the target data, the row data corresponds to an index column in the target data, the index column is obtained based on the target transaction, and the second storage engine supports execution of the target transaction. Further, index data corresponding to a data index condition in the first storage engine is determined from the second index table. Therefore, a data index process across storage engines is implemented. Because the development complexity of introducing new storage engine is reduced, the code reuse of a plurality of storage engines is implemented, and the index efficiency of a database is improved. Further, through the functional design of the second storage engine, the first storage engine can perform a function that the first storage engine cannot mount, which further improves the application range and index efficiency of the database.

First, some terms that may occur in the embodiments of the present disclosure are explained as follows.

MySQL is a relational database management system that uses a plug-in architecture, and may supports a plurality of storage engines simultaneously.

A storage engine is responsible for functions such as data storage, and transaction management in a database management system, which is a core module of the database system. The MySQL may support the plurality of different storage engines simultaneously, to provide different optimized data storage and transaction management abilities for different scenarios. Common storage engines include an InnoDB, an MyISAM, and the like.

Transaction is a database operation sequence that accesses and may manipulate various data items. The transaction is formed by all database operations executed between the beginning and ending of the transaction. The transaction has ACID attributes, that is, atomicity, consistency, isolation, and durability.

Data definition language (DDL), that is, database mode information, is used for describing a language of a database table structure that needs to be stored in the database, such as CREATE, ALTER, and DROP.

Data manipulation language (DML), that is, data manipulation information, is used by a user to implement a basic operation for the database, such as INSERT, DELETE, and UPDATE.

XA mechanism: XA in a database connection transaction is a distributed transaction processing specification provided by an X/Open organization.

Rowno is a function identification that may return a current row number of a current column segment data in a table, that is, a set identification for row data.

Row data is an index value set corresponding to a same key value in an index table.

Index table is a table that indicates a correspondence between a logic record and a physical record, which may be used for identifying data in a database.

It is to be understood, the method for indexing data provided by the present disclosure may be applicable to a system or a program that includes a database or needs to read and write data. For example, a MySQL database or a related program run based on the MySQL, specifically, a data index system may be run in a system architecture as shown in FIG. 1. FIG. 1 is a diagram of a system architecture for running the data index system. The following is described with the MySQL. The MySQL includes an access layer, a service layer, a storage engine layer and a system file layer. The access layer is mainly responsible for connection processing, authorization authentication, security, and the like. The service layer is mainly responsible for querying and parsing, analyzing, optimizing, and caching, and functions of all built-in functions and all cross-storage engines, such as a storage process, a trigger, a view, a binlog, a table lock, are implemented in this layer. The storage engine layer is mainly responsible for storing and extracting data in the MySQL, and the service layer communicates with the storage engine through an API. The storage engine includes dozens of underlying functions API, and each engine provides a set of specific implementations. The system file layer is mainly responsible for reading and writing an underlying file system. The method for indexing data provided by the present disclosure may be applicable to an interaction process of a plurality of storage engines provided in the storage engine layer in a plug-in manner. By reusing the transactions of a first storage engine through a second storage engine, a unified application of the underlying function is implemented. It is to be understood that a first storage engine and a second storage engine are included in the figure. However, in an actual scenario, there may be more first storage engines or more second storage engines, and the specific number depends on the actual scenario. This is not limited herein. Specifically, the type of the storage engine may be an InnoDB, an MyISAM, or a NEWDB.

It is to be understood that the data index system may be run on a server. For example, as an application for cloud data storage, it may also be run on a terminal device, and may also be run on a third-party device to provide a data index to obtain the result of node distribution after the data index. A specific data index system may be performed in the foregoing devices in a program manner, may also be run as a system component in the foregoing devices, or as a kind of cloud service program. A specific running mode depends on an actual scenario. This is not limited herein.

The embodiments of the present disclosure may be an application of a cloud technology. The cloud technology is a hosting technology that unifies a series of resources such as hardware, software, and networks in a wide area network or a local area network to implement computing, storage, processing, and sharing of data.

Specifically, the cloud technology is a collective name of a network technology, an information technology, an integration technology, a management platform technology, an application technology, and the like based on an application of a cloud computing business mode, and may form a resource pool. Usage is based on a requirement and is flexible and convenient. A cloud computing technology becomes an important support. A background service of a technical network system requires a large amount of computing and storage resources, such as a video website, an image website, and more portal websites. As the Internet industry is highly developed and applied, each article may have its own identifier in the future and needs to be transmitted to a background system for logical processing. Data at different levels is separately processed, and data in various industries requires strong system support and this can only be implemented through cloud computing.

However, in the cloud technologies, the participation of a database is required. In short, the database may be considered as an electronic file cabinet, that is, a place for storing an electronic file. A user may perform an operation such as add, query, update, or delete data in the file.

The so-called "database" is a data set that is stored together in a particular manner and can be shared by a plurality of users, has as less redundancy as possible, and is independent of an application program.

Database management system (DBMS) is a computer software system designed for database management, and generally has basic functions such as storage, interception, security, and backup. The database management system may be classified according to a database model supported by the database management system, such as a relational expression or an XML; may be classified according to a computer type supported by the database management system, such as a server cluster or a mobile phone; may be classified according to a query language used by the database management system, such as an SQL or an Xquery; may be classified according to a performance impulse key point, such as a maximum scale or a maximum running speed, or may be classified according to another method. Regardless of which classification method is used, some DBMSs can cross categories, for example, support a plurality of query languages simultaneously.

With the development of cloud technologies, more and more application appears in human life. However, in the cloud technologies, the participation of a database is required to implement a data interaction.

Generally, a database management system MySQL that supports a plurality of storage engines may be used for being applicable to different application scenarios. The ability of different storage engines to support transactions may be different. For example, the InnoDB storage engine implements a complete transaction support, and also supports an XA protocol of a distributed transaction. However, the MyISAM storage engine is convenient for expanding. In addition, the NEWDB engine supports a single-statement transaction, thereby improving a data index process of a plurality of scenarios.

However, in the plug-in architecture of the MySQL, the code of each storage engine is independent. Every time a new storage engine is developed, a complete set of data storage and transaction mechanisms needs to be developed separately. However, this development process is highly complex and easily causes code redundancy, which affects the index efficiency of the database.

Figure 2:
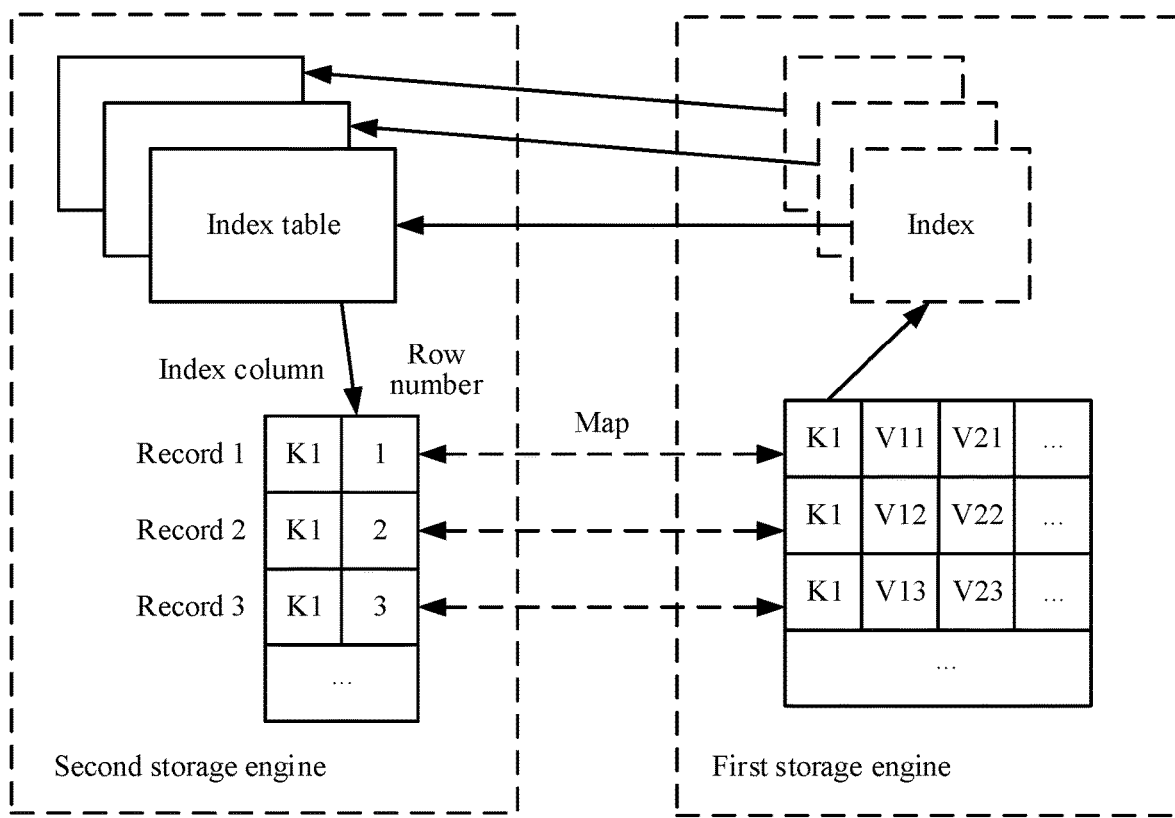
FIG. 2 is an architectural diagram of a procedure of a data index according to an embodiment of the present disclosure.

To resolve the foregoing problems, the present disclosure provides a method for indexing data, and the method is applicable to a procedural framework of the data index as shown in FIG. 2. FIG. 2 is an architectural diagram of a procedure of a data index according to an embodiment of the present disclosure. A target transaction is accessed through a first storage engine, an index table is mapped in a second storage engine based on the target transaction, so that a data index process across storage engines is implemented. Generally, for the second storage engine, a storage engine that has a complete transaction function is used, such as the InnoDB, so that the first storage engine may easily reuse an underlying function in a storage engine layer and perform a data index process.

It is to be understood that the method provided by the present disclosure may be program writing, being served as a processing logic in a hardware system, or as a data index device, which implements the foregoing processing logic by using an integrated or an external manner. As an implementation, the apparatus for indexing data includes: A target transaction is indexed by obtaining indication data, the target data in the first storage engine is determined according to the target transaction, and the target data is included in at least one first index table. Then at least one second index table configured in a second storage engine is determined according to the first index table, the second index table is obtained by adding row numbers based on the first index table, the row numbers are used for indicating row data in the target data, the row data corresponds to an index column in the target data, the index column is obtained based on the target transaction, and the second storage engine supports execution of the target transaction. Further, index data corresponding to a data index condition in the first storage engine is determined from the second index table. Therefore, a data index process across storage engines is implemented. Because the development complexity of introducing new storage engine is reduced, the code reuse of a plurality of storage engines is implemented, and the index efficiency of a database is improved. Further, through the functional design of the second storage engine, the first storage engine can perform a function that the first storage engine cannot mount, which further improves the application range and index efficiency of the database.

Figure 3:
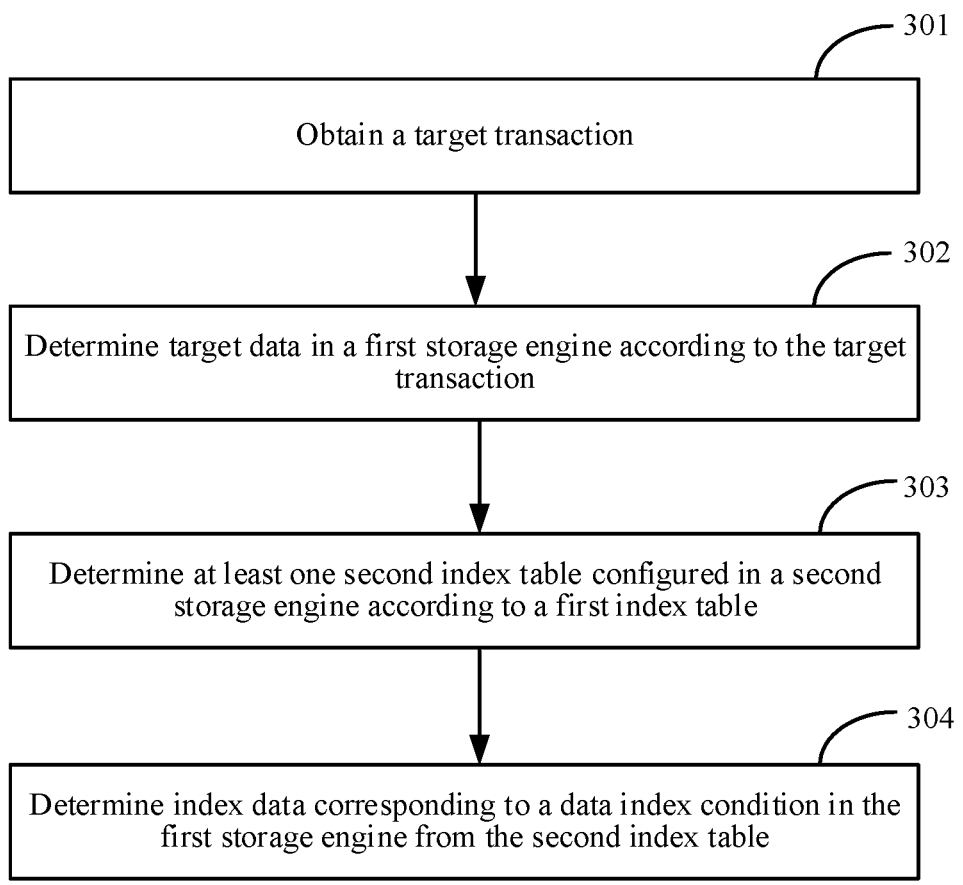
FIG. 3 is a flowchart of a method for indexing data according to an embodiment of the present disclosure.

The method for indexing data in the present disclosure is described as follows with reference to the foregoing procedural architecture. FIG. 3 is a flowchart of a method for indexing data according to an embodiment of the present disclosure. The method is applicable to a computer device, and the embodiments of the present disclosure at least includes the following steps:

301: A computer device obtains a target transaction.

In this embodiment, the target transaction is used for indicating a process of indexing data, where the target transaction may be a transaction that is always executed by a current database, or may also be a newly issued transaction. However, for a first storage engine, the design of an underlying function may not be executed, and the function of indexing data may be implemented through the underlying function of a second storage engine.

302: The computer device determines target data in the first storage engine according to the target transaction.

In this embodiment, the target data is included in at least one first index table, where the first index table records target data of the first storage engine in different versions. In one embodiment, the first storage engine is a NEWDB that only supports a single-statement transaction, and when the engine is newly added, an underlying function of the single-statement transaction needs to be designed, to perform a data interaction through an interface.

303: The computer device determines at least one second index table configured in a second storage engine according to the first index table.

In this embodiment, the second index table is obtained by adding row numbers based on the first index table, the row numbers are used for indicating row data in the target data, the row data corresponds to an index column in the target data, the index column is obtained based on the target transaction, and the second storage engine supports execution of the target transaction. Because each inserted of deleted record has an independent row number, a certain row of data may be directly obtained through the row numbers, to perform batch operations.

It is to be understood that, because the correspondence of different storage engines, in this embodiment, the description is performed based on a case that the first storage engine does not support a multi-statement concurrent transaction, and the second storage engine supports the multi-statement concurrent transaction, to point out a functional characteristic during the process of storage engine reusing, that is, a storage engine having a complete function is used for reusing a storage engine having a single function. In the following, the first storage engine is a NEWDB, and the second storage engine is an InnoDB are used as examples to describe. This is not limited herein.

In some embodiments, because the database involves in an interaction of data during a use process, the data of the database may change, such as implementations of DDL and DML statements. In this case, related data needs to be updated, and the following operations may be executed based on the method for indexing data in the present disclosure, to update the data.

1. For the DDL Statement

Figure 4:
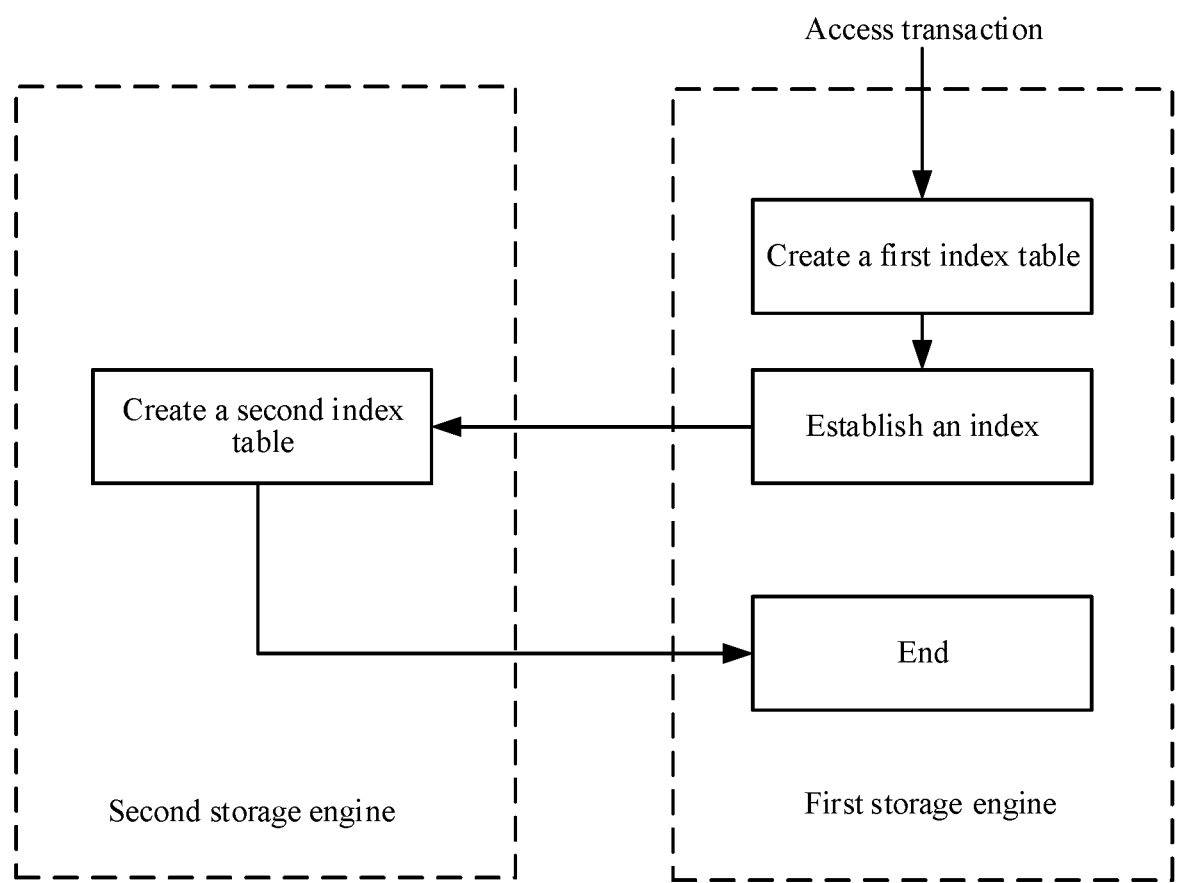
FIG. 4 is a schematic flowchart of updating a data index according to an embodiment of the present disclosure.

In this embodiment, database mode information in the target transaction is first determined, that is, a DDL statement, and then the second index table is updated according to the DDL statement. The DDL statement includes CREATE, ALTER, and DROP, and the like. Specifically, FIG. 4 is a schematic flowchart of updating a data index according to an embodiment of the present disclosure. That is, the transaction is first accessed in the first storage engine and the DDL statement is determined, then the corresponding first index table is determined, the second index table mapped in the second storage engine is searched based on the first index table, and then the index table is created.

For the CREATE statement, it is determined whether a NEWDB table with an index is being created, and if so, an extra corresponding index table is created. The index table includes an index column having a same definition with the NEWDB table, and extra column row numbers with a data type of BIGINT, which is used for representing a column number recorded in the NEWDB engine. That is, the second index table is classified based on an indexing manner, to update the second index table. The indexing manner includes a primary key index, a unique index, or a normal index.

In one embodiment, a second index table is assumed to have a plurality of columns c1, c2, c3, c4, and c5, where c1 and c2 are primary key index columns, c3 and c4 are unique index columns, and c5 is a normal index column. Three corresponding index tables will be created in the InnoDB: a t_pk (c1, c2, rowno), a t_unique1 (c3, c4, rowno), a t_index1 (c5, rowno).

Specifically, the foregoing process may be executed by the following statements:

```
For the primary key index:
CREATE TABLE_NDB_INDEX.t_pk (c1 <Type>// determining
an instruction of the primary key index;
    , c2 <Type>// inputting an index condition;
    , rowno BIGINT// inputting row numbers;
    , PRIMARY KEY (c1, c2)) // determining a primary key
      index column; and
ENGINE = InnoDB; // indicating a storage engine.
For the unique index:
CREATE TABLE_NDB_INDEX.t_uniq1 (c3 <Type>// determining
an instruction of the unique index;
    , c4 <Type>// inputting an index condition;
    , rowno BIGINT// inputting row numbers;
    , UNIQUE INDEX (c3, c4)) // determining a unique index
      column; and
ENGINE = InnoDB; // indicating a storage engine.
For the ordinary index:
CREATE TABLE_NDB_INDEX.t_index1 (c5 <Type>// determining
an instruction of the ordinary index;
    , rowno BIGINT// inputting row numbers;
    , INDEX (c5)) // determining the ordinary index column; and
ENGINE = InnoDB; // indicating a storage engine.
```

The update process of the CREATE statement to the second index table may be implemented through the foregoing implementations.

In addition, when a DROP TABLE statement is executed on the NEWDB engine, if the table has an index, a corresponding index table in an_NDB_INDEX database is deleted, that is, processing information for row data in the DDL statement is obtained. Then based on the processing information, corresponding changing data of the index column is extracted, and the second index table is updated according to the changing data of the index column.

When an ALTER TABLE statement is executed, if the ALTER TABLE statement is an ADD COLUMN, a new column is added in the second index table without processing an existing index table; if the ALTER TABLE statement is a DROP COLUMN, a corresponding column in the second index table needs to be deleted; and if the ALTER TABLE statement is an ADD INDEX, a DROP INDEX, or the like, a corresponding index table needs to be added or deleted.

It is to be understood that the foregoing statements are exemplary descriptions, and the execution of another DDL statement may also be executed with reference to the execution of the CREATE statement, the ALTER statement, or the DROP statement. This is not limited herein.

2. For the DML Statement

In this embodiment, the DML statement includes INSERT, UPDATE, and DELETE, and when these statements are executed, corresponding index tables need to be maintained simultaneously. Specifically, that is, a DML statement in the target transaction is determined, which is used for indicating insertion, update, or deletion of data; and then the second index table is updated according to the DML statement.

For the INSERT statement, first, for each primary key index and unique index on the table, a to-be-inserted record is checked whether it already exists in the index table. If the record exists, the transaction ends, and fails to return the INSERT, otherwise, the record is inserted into the NEWDB engine, and a comparison table of all recorded index columns and row numbers are returned. Then, the data is inserted in batches in the index table according to the returned comparison table in the previous step.

For the DELETE statement, first, according to a WHERE condition in the DELETE statement, a record meeting the condition is searched in the NEWDB engine; then the record meeting the condition is deleted in the NEWDB engine, and the row numbers of the record is recorded; and next, a delete operation is executed in turn in the index table according to the row numbers.

In some embodiments, if the WHERE condition of the DELETE statement has an index column, that is, the data index condition has an index column, a matched recorded row numbers may be first found in the index table according to the index column condition in the WHERE condition. Then the index column condition in the query condition is replaced with the found row numbers, and then the delete operation is executed. Corresponding row number are determined through the data index condition, then a delete operation is executed, thereby reducing the quantity of data processing and improving process efficiency.

For the UPDATE statement, first, according to a WHERE condition in the UPDATE statement, a record meeting the condition is searched in the NEWDB engine; and then the record meeting the condition is deleted in the NEWDB engine, and the row numbers of the record is recorded. Next, a new value is calculated and the record is inserted in the NEWDB engine according to the UPDATE statement, the row numbers of a new record is recorded, and an update operation is executed in turn in the index table according to the recorded new and old row numbers.

In some embodiments, if the if the WHERE condition of the UPDATE statement has an index column, corresponding row number are determined through the data index condition, then an update operation is executed, thereby reducing the quantity of data processing and improving process efficiency.

It is to be understood that, by providing a query and a modification of specified row numbers, the execution efficiency of the operation may be greatly improved; and it has a better effect in some business scenarios, for example, when a business needs to process a plurality of rows of data in batches, the query of a specified row number may ensure not to repeat or wrongly omit data during processing.

304. The computer device determines index data corresponding to a data index condition in the first storage engine from the second index table.

In this embodiment, the index data is included in the target data. An index process may be executed based on the row numbers. Specifically, the data index condition of the target transaction in the first storage engine is first obtained, to determine row numbers indicated by the data index condition; then a corresponding row number in the second index table is determined according to the row numbers indicated by the data index condition, to obtain row data; and then corresponding index data is determined according to the row data. Because the row numbers correspond to a plurality of row data, the record of the position of the corresponding row number are searched directly in the NEWDB engine and the result is returned, without reading all data sequence, thereby greatly improving the query speed.

In some embodiments, if the data index condition indicates an index value, a corresponding second index table may be determined from the at least one second index table according to the target index value; and then the row data corresponding to the target index value in these index tables is screened, to obtain the corresponding index data. For example: if the WHERE condition specifies an index value, first a query is executed through the index table, records meeting the condition in all index tables are queried, and then actual record values based on the row numbers values recorded in the index tables are quickly found.

In one embodiment, the process of the foregoing data query may be implemented through the following statements:

SELECT _rowno FROM t; // selecting row numbers;
SELECT _rowno FROM t WHERE a=12; // determining row numbers in a data index condition;
SELECT * FROM t WHERE _rowno=12; // querying a corresponding row number; and
DELETE FROM t WHERE _rowno=12// extracting a query result Through the foregoing query acceleration process, the efficiency of determining the index data corresponding to the data index condition in the first storage engine from the second index table may be improved.

In combination with the foregoing embodiments, it may be learned that a target transaction is indexed by obtaining indication data, the target data in the first storage engine is determined according to the target transaction, and the target data is included in at least one first index table. Then at least one second index table configured in a second storage engine is determined according to the first index table, the second index table is obtained by adding row numbers based on the first index table, the index column is obtained based on the target transaction, and the second storage engine supports execution of the target transaction. Further, index data corresponding to a data index condition in the first storage engine is determined from the second index table. Therefore, a data index process across storage engines is implemented. Because the development complexity of introducing new storage engine is reduced, the code reuse of a plurality of storage engines is implemented, and the index efficiency of a database is improved. Further, through the functional design of the second storage engine, the first storage engine can perform a function that the first storage engine cannot mount, which further improves the application range and index efficiency of the database.

Figure 5:
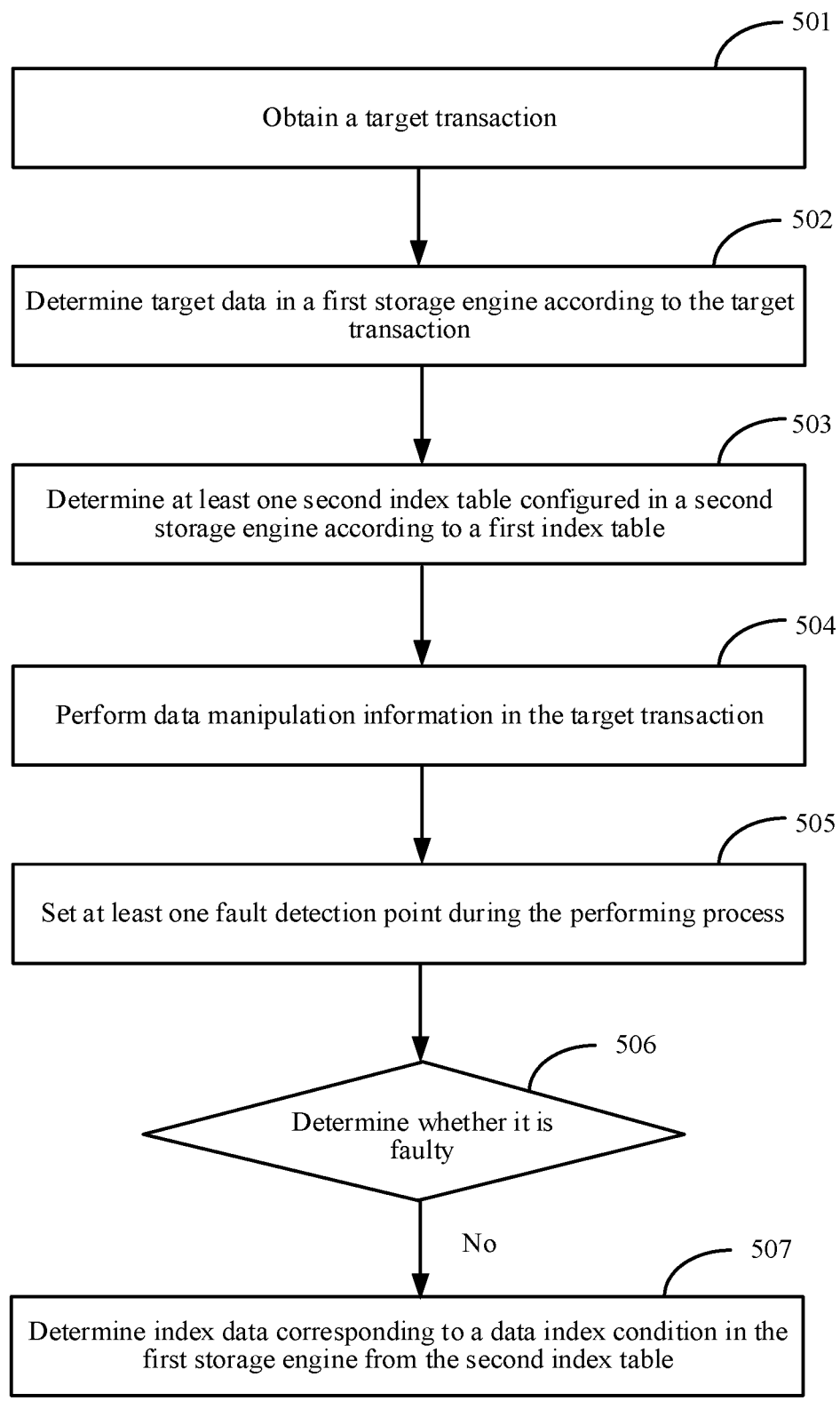
FIG. 5 is a flowchart of another method for indexing data according to an embodiment of the present disclosure.

The foregoing embodiments describe the process of indexing data, in one embodiment, the process of updating data may further be detected, to ensure data consistency. FIG. 5 is a flowchart of another method for indexing data according to an embodiment of the present disclosure. The embodiments of the present disclosure at least include the following steps:

501: A computer device obtains a target transaction.
502: The computer device determines target data in the first storage engine according to the target transaction.
503: The computer device determines at least one second index table configured in a second storage engine according to the first index table.

In this embodiment, steps 501 to 503 are similar to steps 301 to 303 of the embodiment described in FIG. 3, a related feature description may be used as a reference, and details are not described herein again.

504: The computer device executes data manipulation information in the target transaction.

In this embodiment, the related description for the execution of the DML statement in step 303 of the embodiments in FIG. 3 may be used as a reference, and details are not described herein again.

505: The computer device sets at least one fault detection point during the execution process.

In this embodiment, during the execution process, a plurality of versions are used for data storage, and each index table uses a version number to indicate data changes, where the version number is an increasing integer, that is, when the transaction is committed, the version is a switched version, otherwise the old version is used. Specifically, first, according to the change information, a version number corresponding to the first storage engine is determined, to generate a log table in the second storage engine; then a processing procedure corresponding to the change information is determined; at least one fault detection point is set for the processing procedure, the fault detection point is determined based on an interaction process of the first storage engine and the second storage engine; and a status of the data corresponding to an adjacent version number of the first storage engine is determined based on the fault detection point.

In this embodiment, during the execution process, a plurality of versions are used for data storage, and each index table uses a version number to indicate data changes, where the version number is an increasing integer, that is, when the transaction is committed, the version is a switched version, otherwise the old version is used. Specifically, first, according to the change information, a version number corresponding to the first storage engine is determined, to generate a log table in the second storage engine; then a processing procedure corresponding to the change information is determined, at least one fault detection point is set for the processing procedure, the fault detection point is determined based on an interaction process of the first storage engine and the second storage engine; and a status of the data corresponding to an adjacent version number of the first storage engine is determined based on the fault detection point.

In some embodiments, the log table may use the following structures:

```
CREATE TABLE_newdb.wal (dbid BIGINT// creating a log table
, tableid BIGINT// recording the index table
, version BIGINT// recording the version number
, PRIMARY KEY (dbid, tableid)) // recording an association
relationship
    ENGINE = InnoDB; // the type of a database
```

Figure 6:
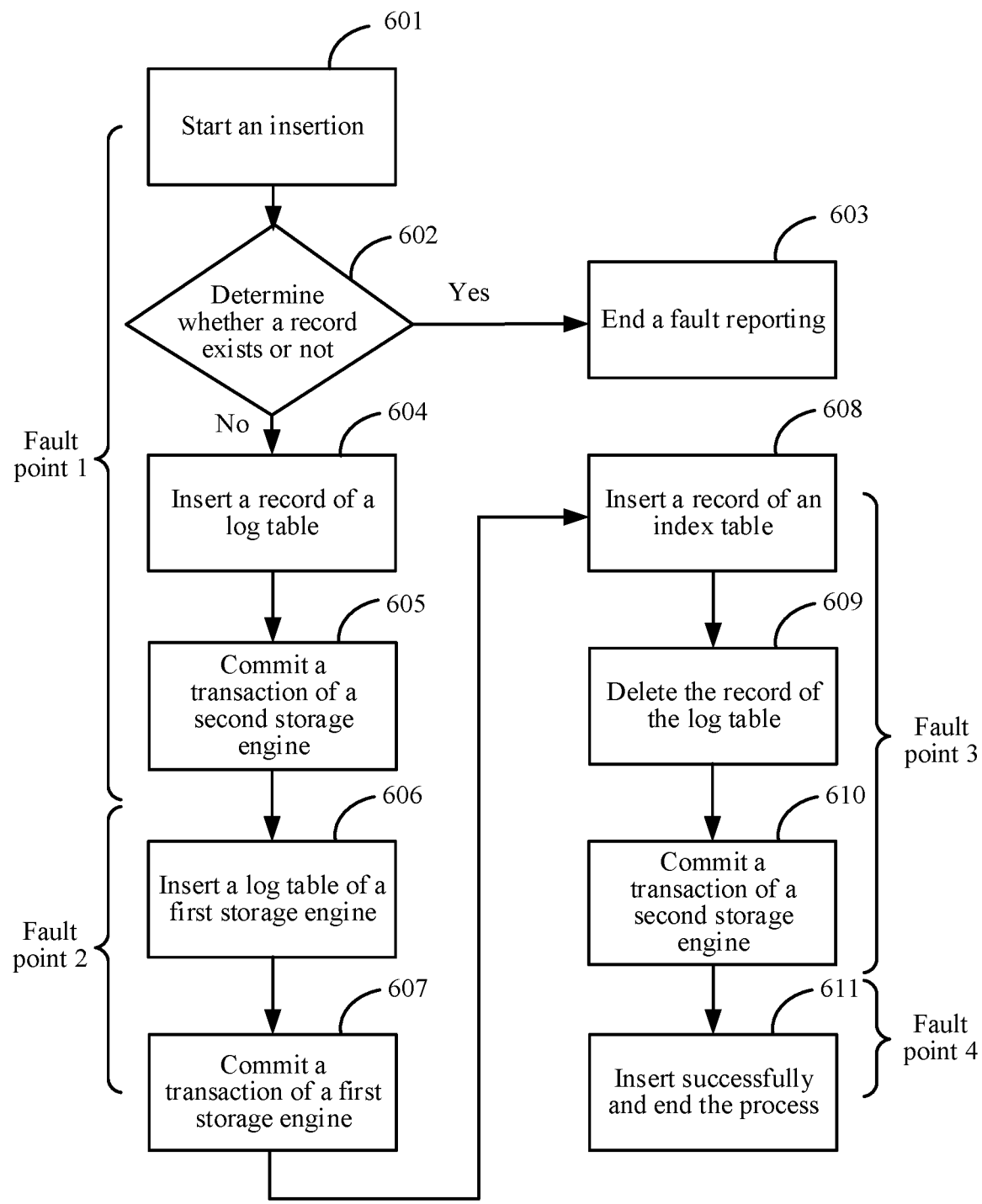
FIG. 6 is a schematic flowchart of a data insertion operation according to an embodiment of the present disclosure.

Specifically, correspond to the execution of specific DML statements. For the INSERT statement, the process shown in FIG. 6 may be used as a reference. FIG. 6 is a schematic flowchart of a data insertion operation according to an embodiment of the present disclosure. The process includes the following steps:

601: A computer device starts an insertion.

602: The computer device determines whether the record exists or not.

In this embodiment, for each primary key index and unique index on the second index table, a to-be-inserted record is checked whether it already exists in the index table. If the record exists, the transaction ends, and fails to return the INSERT.

603: The computer device ends a fault reporting.

604: The computer device inserts a record of a log table.

In this embodiment, the version of the second index table in step 602 is recorded, and then records (dbid, tableid, and version) that is, a storage engine ID, an index table ID, and a version number are inserted in the index table _newdb.wal.

605: The computer device commits a transaction of a second storage engine.

606. The computer device inserts a log table of a first storage engine.

In this embodiment, the data consistency is determined by comparing the log table. In this case, the log table insertion process is executed in the first storage engine; that is, a NEWDB table record data is inserted, and the transaction of the NEWDB is committed. The committed NEWDB table version is switched to a version+1 version.

607: Commit, by the computer device, a first storage engine transaction.

608: Insert, by the computer device, a record of the index table.

In this embodiment, a record index column and row numbers returned by inserting the NEWDB table are inserted into a corresponding index table.

609: The computer device deletes the record of the log table.

In this embodiment, the record inserted in step 604 in the table _newdb.wal is deleted.

610: The computer device commits a transaction of the second storage engine.

611: The computer device inserts successfully and ends the process.

For the foregoing insert process, four fault point may be set, where steps 601 to 605 are the detection process of a fault point 1, steps 606 to 607 are the detection process of a fault point 2, steps 608 to 610 are the detection process of a fault point 3, and step 611 is the detection process of a fault point 4.

Specifically, for the fault point 1, a fault reason thereof may be that the table newdb.wal does not insert the record, or inserts the record but does not commit the record. In this case, because the newdb.wal table uses a storage engine having a complete transaction support, and after the recovery, due to the insurance of transaction atomicity, the inserted but uncommitted record is rolled back. Therefore, the fault point does not need an extra fault recovery process to ensure that the data and index of the NEWDB are consistent.

For the fault point 2, in this case, the newdb.wal table records new data, but the transaction of the NEWDB is not committed. Although the data and the index are not inconsistent, the record of the newdb.wal table may be incorrect, which needs to be recovered. When the recovery is executed, a version recorded in newdb.wal may be found according to dbid and tableid fields, such as 1, and then the current version of the NEWDB table is determined. If it is also 1, it means that the record in the newdb.wal table needs to be rolled back. The roll back operation may be an operation that directly deletes a corresponding record in the newdb.wal table.

For the fault point 3, in this case, the newdb.wal table records new data and the transaction of the NEWDB is committed, but the record of the index table is not updated and the record of the newdb.wal table is also not deleted. The data and the index are not consistent, which needs to be recovered. When the recovery is executed, a version recorded in newdb.wal is found according to dbid and tableid fields, such as 1, and then the current version of the NEWDB table is determined. If it is 2, it means that the data and the index are not consistent, and the recovery process needs to be redone. Because the newdb.wal table and the index table are a same storage engine, and the engine supports a complete transaction. Therefore, the operations of these two tables in the third step maintain consistent. A record change appeared between the version 1 and the version 2 is queried and compared in the NEWDB table, and these record row numbers of the changes are written into the index table, the record of the newdb.wal table is deleted, and the transaction is committed.

For the fault point 4, because the transactions of all steps are committed. Therefore, data is in a consistent state, and the data recovery may not be executed.

In addition, for the DELETE statement, first, before the index table in the NEWDB is deleted, the version of the NEWDB table is recorded, the records (dbid, tableid, and version) are inserted in the _newdb.wal table, and the transaction is committed. Then a record meeting the condition is searched in the NEWDB engine according to the WHERE condition in the DELETE statement. If the WHERE statement specifies row numbers, the record of the NEWDB table that needs to be deleted is found directly through the row numbers. If the WHERE statement specifies an index column, row numbers of the record of the NEWDB table that needs to be deleted is found through the index table, then the record of the NEWDB table that needs to be deleted is found directly through the row numbers. If the WHERE statement does not specify row numbers and an index column, the record in the NEWDB table needs to be searched sequentially, to find the record that needs to be deleted. Further, the found NEWDB record is deleted and committed, and the version of the committed NEWDB table is switched to version+1. Then a corresponding record in the index table is deleted according to the row numbers of the deleted row of the NEWDB table, the record of the _newdb.wal table inserted in the first step is deleted, and the transaction is committed.

For the UPDATE statement, first, before the index table in the NEWDB is updated, the version of the NEWDB is recorded, the records (dbid, tableid, and version) are inserted into the _newdb.wal table, and the transaction is committed. Then a record meeting the condition is searched in the NEWDB engine according to the WHERE condition in the UPDATE statement. If the WHERE statement specifies row numbers, the record of the NEWDB that needs to be deleted is found directly through row numbers. If the WHERE statement specifies the index, row numbers of the record of the NEWDB table that needs to be deleted is found through the index table, then the record of the NEWDB table that needs to be deleted is found. If the WHERE statement does not specify the row numbers and the index, the record in the NEWDB table needs to be searched sequentially, to find the record that needs to be deleted. Next, a new value is calculated and the record is inserted according to the UPDATE statement, the row numbers of a new record is recorded and committed. The committed NEWDB table version is switched to version+1. Then a corresponding record is updated in the index table according to the row numbers of the new and old rows of the NEWDB table, the record of the _newdb.wal table inserted in the first step is deleted, and the transaction is committed.

In some embodiments, the log table in the foregoing process of the fault detection may also use a log table that records the row numbers of all modified records, and a REDO or an UNDO operation is executed according to the data in the log table during a recovery stage, that is, a recovery unit is detected and recovered based on the row numbers.

506: The computer device determines whether it is faulty.

In this embodiment, through the determining process for different fault points described in step 505, the determining result may be obtained. If it is determined to be a fault, a row data recovery needs to be executed to ensure data consistency; and if it is determined to be normal, the index process of step 507 is executed.

507. The computer device determines index data corresponding to a data index condition in the first storage engine from the second index table.

In this embodiment, step 507 is similar to step 304 of the embodiment in FIG. 3, a related feature description may be used as a reference, and details are not described herein again.

In combination with the foregoing embodiment, it may be seen that, by reusing a storage engine having a complete transaction function, the index of a new engine is implemented, thereby reducing the difficulty of implementing the index of the new engine and the risk of problems. Further, the index of the new engine is implemented by reusing the storage engine having the complete transaction function, and an existing mature module may be reused, to reduce the quantity of development work, so that the new engine does not need to reimplement a B+ tree, and also does not need to implement a complete transaction support on the B+ tree.

Figure 7:
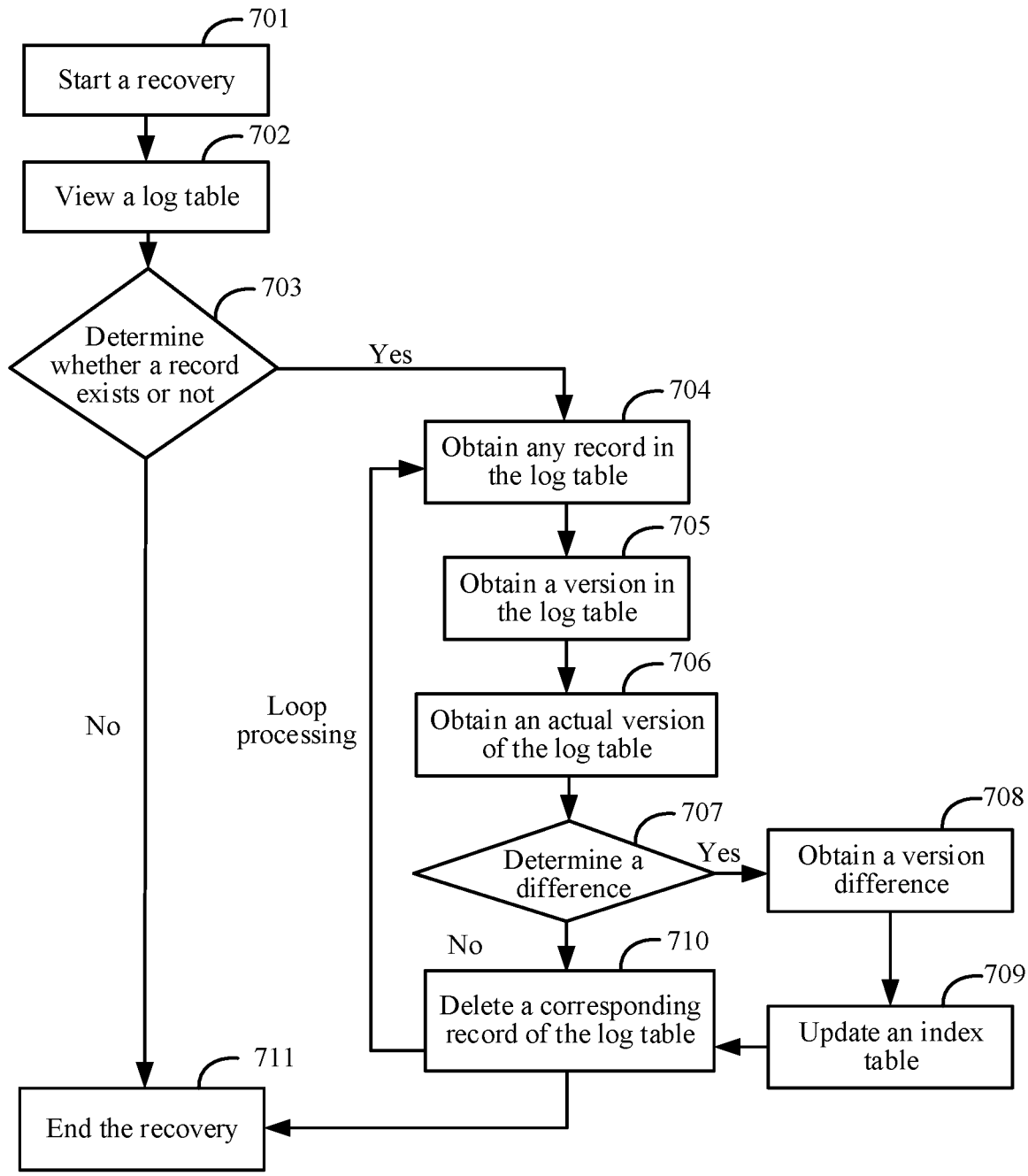
FIG. 7 is a flowchart of a method for recovering data according to an embodiment of the present disclosure.

The foregoing embodiments describe the process of detecting a fault in a data index, and the following describes a data recovery process after a fault is detected. FIG. 7 is a flowchart of a method for recovering data according to an embodiment of the present disclosure. The embodiments of the present disclosure at least include the following steps:

701: A computer device starts a recovery.

702: The computer device views a log table.

In this embodiment, the log table is the log table of the second storage engine, which records a related data operation record executed by the index table in the second storage engine according to the DML statement.

703: The computer device determines whether the record exists or not.

In this embodiment, if the operation record exists, step 704 is executed; and if the operation record does not exist, step 711 is executed.

704: The computer device obtains any record in the log table.

In this embodiment, the obtaining a process recorded in the log table may be a random selection, or a record selection based on a certain rule and order, for example: first obtain the record of a data insertion.

705: The computer device obtains a version in the log table.

706: The computer device obtains an actual version of the log table.

In this embodiment, the actual version of the log table is a storage engine data state after the transaction corresponding to the log table is executed.

707: The computer device determines a difference.

In this embodiment, by comparing data corresponding to the version in the log table and data of the actual version of the log table, a data difference is determined.

708: The computer device obtains a version difference.

709: The computer device updates the index table.

In this embodiment, corresponding difference data is determined according to the version difference, and the difference data is modified correspondingly in the index table, to update the index table. Specifically, the index table may be updated as data corresponding to the actual version of the log table.

710: The computer device deletes a corresponding record of the log table.

711: The computer device ends the recovery.

In combination with the foregoing embodiments, it may be seen that a version number recorded in a log table in a second storage engine is determined, then a version number of a first storage engine is determined according to change information, and the version number recorded in the log table and the version number of the first storage engine are compared, to generate a difference record; so that the first index table and the second index table are updated according to the difference record, thereby implementing the recovery process of the data fault, ensuring data consistency, and improving the accuracy of storage engine data processing.

Figure 8:
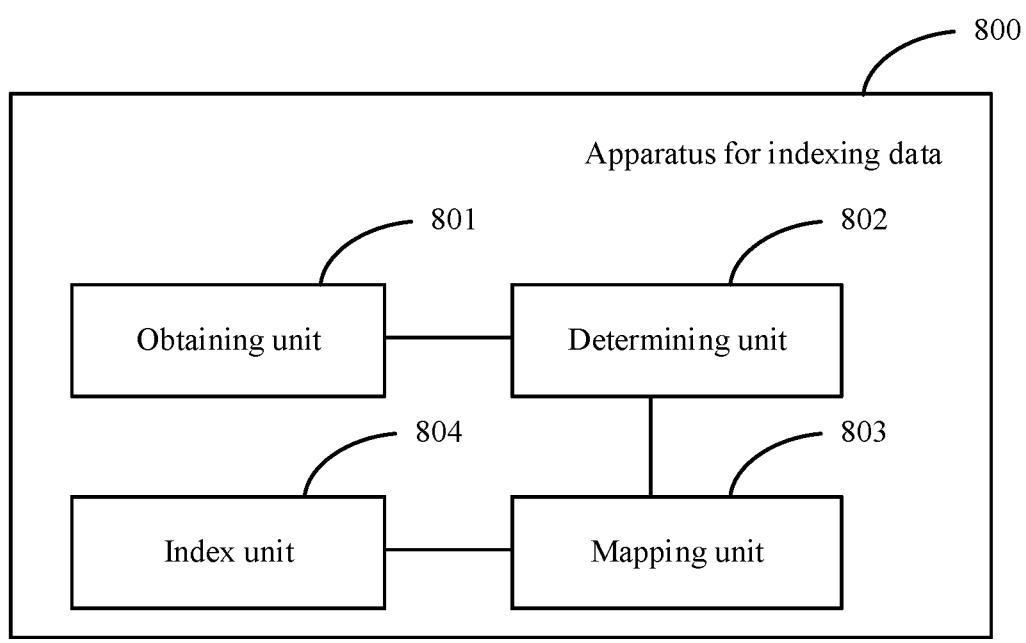
FIG. 8 is a schematic structural diagram of an apparatus for indexing data according to an embodiment of the present disclosure.

To better implement the foregoing solutions in the embodiments of the present disclosure, the following further provides a related apparatus configured to implement the foregoing solutions. FIG. 8 is a schematic structural diagram of an apparatus for indexing data according to an embodiment of the present disclosure. An apparatus 800 for indexing data includes:

an obtaining unit 801, configured to obtain a target transaction, the target transaction being used for indicating a process of indexing data;

a determining unit 802, configured to determine target data in a first storage engine according to the target transaction, the target data being included in at least one first index table;

a mapping unit 803, configured to determine at least one second index table configured in a second storage engine according to the first index table, the second index table being obtained by adding row numbers based on the first index table, the row numbers being used for indicating row data in the target data, the second storage engine supporting execution of the target transaction; and an index unit 804, configured to determine index data corresponding to a data index condition in the first storage engine from the second index table, the index data being included in the target data.

In some embodiments, the index unit 804 is configured to obtain the data index condition of the target transaction in the first storage engine, to determine row numbers indicated by the data index condition.

The index unit 804 is configured to determine row data of a corresponding row number in the second index table according to the row numbers indicated by the data index condition.

The index unit 804 is configured to determine corresponding index data according to the row data of the corresponding row number in the second index table.

In some embodiments, the data index condition includes a target index value, and the index unit 804 is configured to determine a corresponding second index table from the at least one second index table according to the target index value.

The index unit 804 is configured to determine row data corresponding to the target index value in the corresponding second index table, to obtain the corresponding index data.

In some embodiments, the mapping unit 803 is further configured to determine data manipulation information in the target transaction, and the data manipulation information is used for indicating insertion, update, or deletion of data.

The mapping unit 803 is further configured to update the second index table according to the data manipulation information.

In some embodiments, the mapping unit 803 is configured to determine change information in the first index table according to the data manipulation information.

The mapping unit 803 is configured to determine a corresponding row number in the second index table according to the change information.

The mapping unit 803 is configured to determine an item corresponding to the change information in the second index table based on the corresponding row number in the second index table, to update the second index table.

In some embodiments, the mapping unit 803 is configured to determine a version number corresponding to the first storage engine according to the change information, to generate a log table in the second storage engine.

The mapping unit 803 is configured to determine a status of data corresponding to an adjacent version number of the first storage engine in the log table, to perform a data recovery.

In some embodiments, the mapping unit 803 is configured to determine a processing procedure corresponding to the change information.

The mapping unit 803 is configured to set at least one fault detection point for the processing procedure, and the fault detection point is determined based on an interaction process of the first storage engine and the second storage engine.

The mapping unit 803 is configured to determine a status of the data corresponding to the adjacent version number of the first storage engine based on the fault detection point, to perform the data recovery.

In some embodiments, the index unit 804 is configured to determine a version number recorded in the log table in the second storage engine.

The index unit 804 is configured to determine a version number of the first storage engine according to the change information.

The index unit 804 is configured to compare the version number recorded in the log table and the version number of the first storage engine, to generate a difference record.

The index unit 804 is configured to update the first index table and the second index table according to the difference record.

In some embodiments, the mapping unit 803 is further configured to determine database mode information in the target transaction.

The mapping unit 803 is further configured to update the second index table according to the database mode information.

In some embodiments, the database mode information includes at least one indexing manner, and the mapping unit 803 is configured to classify the second index table based on the indexing manner, to update the second index table. The indexing manner includes a primary key index, a unique index, or a normal index.

In some embodiments, the row data indicated by the row numbers of the second index table corresponds to an index column in the target data, the index column being obtained by the target transaction. The mapping unit 803 is configured to obtain processing information of the row data in the database mode information.

The mapping unit 803 is configured to extract a corresponding index column change data based on the processing information.

The mapping unit 803 is configured to update the second index table according to the index column change data.

A target transaction is indexed by obtaining indication data, the target data in the first storage engine is determined according to the target transaction, and the target data is included in at least one first index table. Then at least one second index table configured in a second storage engine is determined according to the first index table, the second index table is obtained by adding row numbers based on the first index table, the row numbers is used for indicating row data in the target data, and the second storage engine supports execution of the target transaction. Further, index data corresponding to a data index condition in the first storage engine is determined from the second index table. Therefore, a data index process across storage engines is implemented. Because the development complexity of introducing new storage engine is reduced, the code reuse of a plurality of storage engines is implemented, and the index efficiency of a database is improved. Further, through the functional design of the second storage engine, the first storage engine can perform a function that the first storage engine cannot mount, which further improves the application range and index efficiency of the database.

Figure 9:
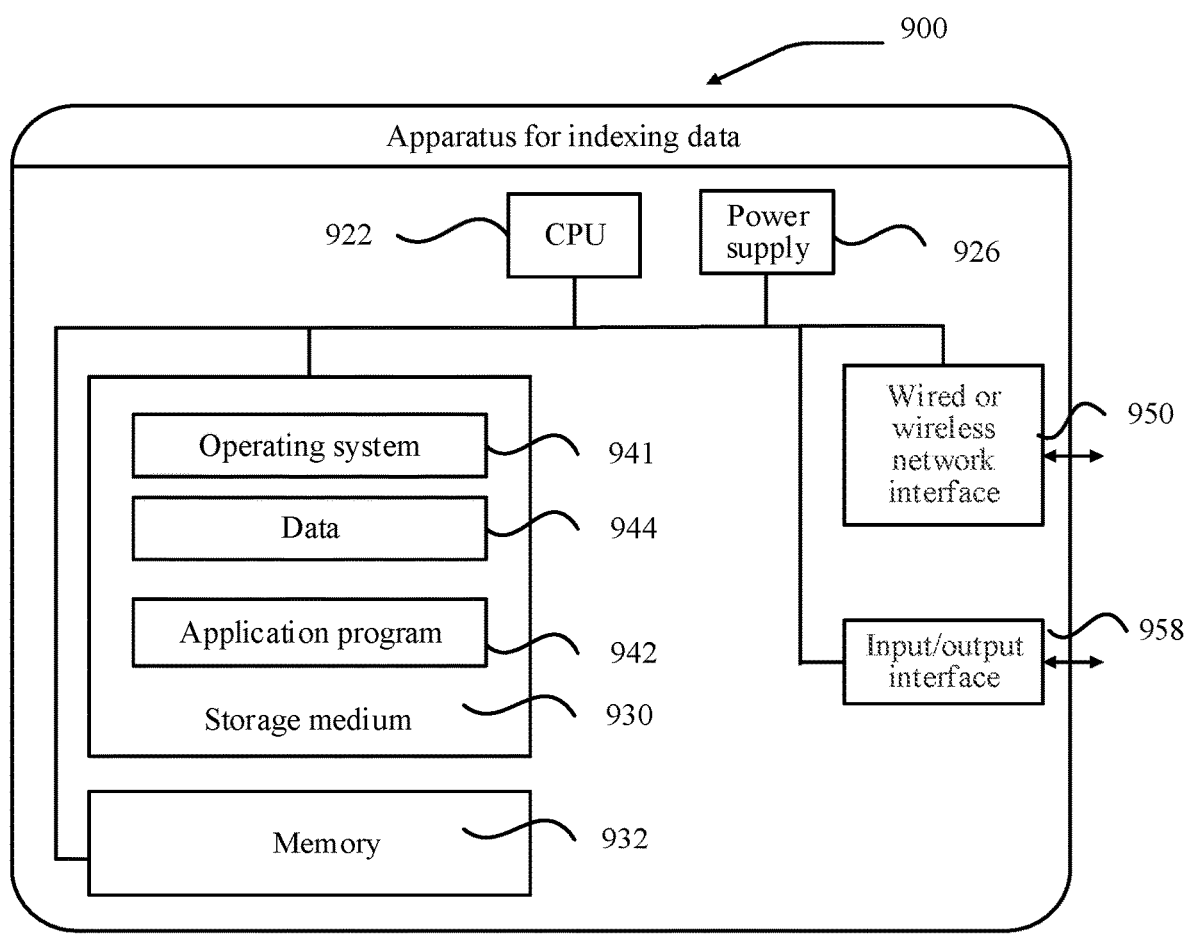
FIG. 9 is a schematic structural diagram of another apparatus for indexing data according to an embodiment of the present disclosure.

The embodiments of the present disclosure further provides another data index apparatus. FIG. 9 is a schematic structural diagram of another apparatus for indexing data according to an embodiment of the present disclosure. The apparatus 900 for indexing data may vary greatly due to different configurations or performance, and may include one or more central processing units (CPU) 922 (for example, one or more processors) and a memory 932, and one or more storage media 930 (for example, one or more mass storage devices) that store an application program 942 or data 944. The memory 932 and the storage medium 930 may be transient storage or permanent storage. The program stored in the storage medium 930 may include one or more modules (not marked in the figure), and each module may include a series of instruction operations to the apparatus for indexing data. Further, the CPU 922 may be configured to: communicate with the storage medium 930, and perform, on the apparatus 900 for indexing data, the series of instruction operations in the storage medium 930.

The apparatus 900 for indexing data may further include one or more power supplies 926, one or more wired or wireless network interfaces 950, one or more input/output interfaces 958, and/or one or more operating systems 941, for example, Windows Server™, Mac OS X™, Unix™, Linux™, or FreeBSD™.

Steps executed by the apparatus for indexing data in the foregoing embodiment may be based on the structure of the apparatus for indexing data shown in FIG. 9.

An embodiment of the present disclosure further provides a computer-readable storage medium, the computer-readable storage medium being used for storing a computer program, the computer program being used for performing the steps executed by the apparatus for indexing data in the method described in the embodiments shown in FIG. 2 to FIG. 7.

An embodiment of the present disclosure further provides a computer program product including data index instructions, the instructions, when run on a computer, causing the computer to execute steps run by the apparatus for indexing data in the method described in the embodiments shown in FIG. 2 to FIG. 7.

The embodiments of the present disclosure further provide a data index system. The data index system may include the apparatus for indexing data in the embodiments described in FIG. 8, or the apparatus for indexing data described in FIG. 8.

A person skilled in the art can clearly understand that for convenience and conciseness of description, for specific working processes of the foregoing described system, apparatus and unit, refer to the corresponding processes in the foregoing method embodiments, and details are not described herein.

In the several embodiments provided in the present disclosure, the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be omitted or not executed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the present disclosure may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, an apparatus for indexing data, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for indexing data in a second storage engine in a database management system, the method comprising:
   obtaining a target transaction, the target transaction indicating a process of indexing data across the second storage engine and a first storage engine of the same database management system, wherein the database management system uses a plug-in architecture to simultaneously support the first storage engine and the second storage engine, and the first storage engine and the second storage engine are configured to implement data storage and transaction management functions in different manners in the database management system;
   determining target data in the first storage engine according to the target transaction, the target data being comprised in at least one first index table configured in the first storage engine;
   determining, according to the first index table, at least one second index table configured in the second storage engine, the second index table being obtained by adding row numbers to an index column corresponding to the target data to map records in the second index table with corresponding records in the first index table, wherein each record in the second index table has an independent row number and has a corresponding record in the first index table, the row numbers indicating row data in the target data, and the second storage engine supporting execution of the target transaction; and determining, according to a data index condition in the first storage engine, index data from the second index table, the index data being comprised in the target data.

2. The method according to claim 1, wherein the determining index data corresponding to a data index condition in the first storage engine from the second index table comprises:

obtaining the data index condition of the target transaction in the first storage engine to determine a row number indicated by the data index condition;

determining row data corresponding to the row number in the second index table according to the row number indicated by the data index condition; and determining the corresponding index data according to the row data of the corresponding row number in the second index table.

3. The method according to claim 1, wherein the data index condition comprises a target index value, and the determining index data corresponding to a data index condition in the first storage engine from the second index table comprises:

determining a target second index table from the at least one second index table according to the target index value; and determining row data corresponding to the target index value in the target second index table to obtain the corresponding index data.

4. The method according to claim 1, further comprising:

determining data manipulation information in the target transaction, the data manipulation information indicating insertion, update, or deletion of data; and updating the second index table according to the data manipulation information.

5. The method according to claim 4, wherein the updating the second index table according to the data manipulation information comprises:

determining change information in the first index table according to the data manipulation information;

determining a corresponding row number in the second index table according to the change information; and determining an item corresponding to the change information in the second index table based on the corresponding row number in the second index table to update the second index table.

6. The method according to claim 5, wherein in a process of executing transaction on the target data, a plurality of versions of index tables are used for data storage, each index table has a corresponding version number to indicate data change, a version number of an index table after the transaction is committed is different from a version number of an index table before the transaction is committed; and after the determining an item corresponding to the change information in the second index table based on the corresponding row number in the second index table to update the second index table, the method further comprises:

determining a version number corresponding to the first storage engine according to the change information, to generate a log table in the second storage engine configured to record an association relationship between the first index table having the version number corresponding to the change information and the second index table in the second storage engine; and determining a data record corresponding to an adjacent version number of the first storage engine in the log table to perform data recovery.

7. The method according to claim 6, wherein the determining a data record corresponding to an adjacent version number of the first storage engine in the log table to perform data recovery comprises:

determining a processing procedure corresponding to the change information;

setting at least one fault detection point for the processing procedure, the fault detection point being determined based on an interaction process of the first storage engine and the second storage engine; and determining the data record corresponding to the adjacent version number of the first storage engine based on the fault detection point to perform the data recovery.

8. The method according to claim 6, wherein the performing data recovery comprises:

determining a version number recorded in the log table in the second storage engine;

determining the version number of the first storage engine according to the change information;

comparing the version number recorded in the log table and the version number of the first storage engine to generate a difference record; and updating the first index table and the second index table according to the difference record.

9. The method according to claim 1, further comprising:

determining database mode information in the target transaction; and updating the second index table according to the database mode information.

10. The method according to claim 9, wherein the database mode information comprises at least one indexing manner, and the updating the second index table according to the database mode information comprises:

classifying the second index table based on the indexing manner to update the second index table, the indexing manner comprising a primary key index, a unique index, or a normal index.

11. The method according to claim 9, wherein the row data indicated by the row number in the second index table corresponds to an index column in the target data, the index column is obtained based on the target transaction, and the updating the second index table according to the database mode information comprises:

obtaining processing information of the row data in the database mode information;

extracting corresponding index column change data based on the processing information; and updating the second index table according to the index column change data.

12. The method according to claim 1, wherein the first storage engine supports a single-statement transaction but does not support a multi-statement concurrent transaction, and the second storage engine supports the multi-statement concurrent transaction.

13. A computer device, comprising at least one processor and at least one memory, the at least one memory being configured to store program code, and the at least one processor being configured, when executing the program code, to perform:

obtaining a target transaction, the target transaction indicating a process of indexing data across a first storage engine and a second storage engine of a same database management system, wherein the database management system uses a plug-in architecture to simultaneously support the first storage engine and the second storage engine, and the first storage engine and the second storage engine are configured to implement data storage and transaction management functions in different manners in the database management system;

determining target data in the first storage engine according to the target transaction, the target data being comprised in at least one first index table configured in the first storage engine;

determining, according to the first index table, at least one second index table configured in the second storage engine, the second index table being obtained by adding row numbers to an index column corresponding to the target data to map records in the second index table with corresponding records in the first index table, wherein each record in the second index table has an independent row number and has a corresponding record in the first index table, the row numbers indicating row data in the target data, and the second storage engine supporting execution of the target transaction; and determining, according to a data index condition in the first storage engine, index data from the second index table, the index data being comprised in the target data.

14. The device according to claim 13, wherein the determining index data corresponding to a data index condition in the first storage engine from the second index table comprises:

obtaining the data index condition of the target transaction in the first storage engine to determine a row number indicated by the data index condition;

determining row data corresponding to the row number in the second index table according to the row number indicated by the data index condition; and determining the corresponding index data according to the row data of the corresponding row number in the second index table.

15. The device according to claim 13, wherein the data index condition comprises a target index value, and the determining index data corresponding to a data index condition in the first storage engine from the second index table comprises:

determining a target second index table from the at least one second index table according to the target index value; and determining row data corresponding to the target index value in the target second index table to obtain the corresponding index data.

16. The device according to claim 13, wherein the processor is further configured to perform:

determining data manipulation information in the target transaction, the data manipulation information indicating insertion, update, or deletion of data; and updating the second index table according to the data manipulation information.

17. The device according to claim 16, wherein the updating the second index table according to the data manipulation information comprises:

determining change information in the first index table according to the data manipulation information;

determining a corresponding row number in the second index table according to the change information; and determining an item corresponding to the change information in the second index table based on the corresponding row number in the second index table to update the second index table.

18. The device according to claim 17, wherein in a process of executing transaction on the target data, a plurality of versions of index tables are used for data storage, each index table has a corresponding version number to indicate data change, a version number of an index table after the transaction is committed is different from a version number of an index table before the transaction is committed; and after the determining an item corresponding to the change information in the second index table based on the corresponding row number in the second index table to update the second index table, the at least one processor is further configured to perform:

determining a version number corresponding to the first storage engine according to the change information, to generate a log table in the second storage engine configured to record an association relationship between the first index table having the version number corresponding to the change information and the second index table in the second storage engine; and determining a data record corresponding to an adjacent version number of the first storage engine in the log table to perform data recovery.

19. The device according to claim 18, wherein the determining a data record corresponding to an adjacent version number of the first storage engine in the log table to perform data recovery comprises:

determining a processing procedure corresponding to the change information;

setting at least one fault detection point for the processing procedure, the fault detection point being determined based on an interaction process of the first storage engine and the second storage engine; and determining the data record corresponding to the adjacent version number of the first storage engine based on the fault detection point to perform the data recovery.

20. A non-transitory computer-readable storage medium, configured to store a computer program, the computer program, when executed by at least one processor, causing the at least one processor perform:

obtaining a target transaction, the target transaction indicating a process of indexing data across a first storage engine and a second storage engine of a same database management system, wherein the database management system uses a plug-in architecture to simultaneously support the first storage engine and the second storage engine, and the first storage engine and the second storage engine are configured to implement data storage and transaction management functions in different manners in the database management system;

determining target data in the first storage engine according to the target transaction, the target data being comprised in at least one first index table configured in the first storage engine;

determining, according to the first index table, at least one second index table configured in the second storage engine, the second index table being obtained by adding row numbers to an index column corresponding to the target data to map records in the second index table with corresponding records in the first index table, wherein each record in the second index table has an independent row number and has a corresponding record in the first index table, the row numbers indicating row data in the target data, and the second storage engine supporting execution of the target transaction; and determining, according to a data index condition in the first storage engine, index data from the second index table, the index data being comprised in the target data.

* * * * *